(12) United States Patent
Lee et al.

(10) Patent No.: US 9,012,064 B2
(45) Date of Patent: Apr. 21, 2015

(54) CURRENT COLLECTING PLATE AND SECONDARY BATTERY INCLUDING CURRENT COLLECTING PLATE

(75) Inventors: Chi-Young Lee, Yongin-si (KR); Yong-Sam Kim, Yongin-si (KR); Seok-Yoon Yoo, Yongin-si (KR); Dong-Wook Kim, Yongin-si (KR); Jong-Seok Moon, Yongin-si (KR); Sang-Eun Cheon, Yongin-si (KR)

(73) Assignees: Samsung SDI Co., Ltd., Yongin-Si, Gyeonggi-Do (KR); Robert Bosch GmbH, Stuttgart (DE)

( * ) Notice: Subject to any disclaimer, the term of this patent is extended or adjusted under 35 U.S.C. 154(b) by 901 days.

(21) Appl. No.: 12/805,881

(22) Filed: Aug. 23, 2010

(65) Prior Publication Data
US 2011/0104537 A1    May 5, 2011

(30) Foreign Application Priority Data

Oct. 30, 2009    (KR) .................. 10-2009-0104305

(51) Int. Cl.
| H01M 2/26 | (2006.01) |
| H01M 4/70 | (2006.01) |
| H01M 2/22 | (2006.01) |
| H01M 10/04 | (2006.01) |

(52) U.S. Cl.
CPC ........ *H01M 4/70* (2013.01); *H01M 2/22* (2013.01); *H01M 10/0431* (2013.01)

(58) Field of Classification Search
CPC .......................... H01M 2/26; H01M 2/263
USPC .................................... 429/94, 161
See application file for complete search history.

(56) References Cited

U.S. PATENT DOCUMENTS

| 2001/0036574 A1 | 11/2001 | Fukuda et al. |
| 2005/0118501 A1 | 6/2005 | Hashimoto et al. |
| 2006/0063069 A1* | 3/2006 | Kim .............................. 429/161 |
| 2008/0026291 A1* | 1/2008 | Kim .............................. 429/211 |

FOREIGN PATENT DOCUMENTS

| JP | 2001-093504 A | 4/2001 |
| JP | 2001-313068 A | 11/2001 |
| JP | 2001-325938 | 11/2001 |

(Continued)

OTHER PUBLICATIONS

Korean Office Action in KR 10-2009-0104305, dated Jun. 29, 2011 (Lee, et al.).

(Continued)

*Primary Examiner* — Jonathan G Leong
*Assistant Examiner* — James Erwin
(74) *Attorney, Agent, or Firm* — Lee & Morse, P.C.

(57) ABSTRACT

A secondary battery includes an electrode assembly including a positive electrode, a negative electrode, and separators which are wound together, current collecting plates attached to the electrode assembly, a case configured to accommodate the electrode assembly and the current collecting plates, and a cap configured to cover an opening of the case and electrically connect to the current collecting plates. Each of the current collecting plates includes a current collecting part and a welding part. The current collecting parts electrically connect to the electrode assembly. The welding part is welded to the electrode assembly and the current collecting part.

19 Claims, 4 Drawing Sheets

(56) References Cited

FOREIGN PATENT DOCUMENTS

| | | |
|---|---|---|
| JP | 2005-166571 A | 6/2005 |
| KR | 10 2007-0111217 A | 11/2007 |
| KR | 10-0776766 B1 | 11/2007 |

OTHER PUBLICATIONS

Korean Notice of Allowance in KR 10-2009-0104305, dated Feb. 22, 2012 (Lee, et al.).

* cited by examiner

CURRENT COLLECTING PLATE AND SECONDARY BATTERY INCLUDING CURRENT COLLECTING PLATE

BACKGROUND

1. Field

Embodiments relate to a current collecting plate and a secondary battery including the same.

2. Description of the Related Art

Secondary batteries are rechargeable batteries widely used in portable electronic devices such as mobile phones, notebook computers, and camcorders.

A secondary battery may include a case having an open portion, an electrode assembly accommodated in the case, and a cap covering the open portion. The electrode assembly may include a positive electrode, a negative electrode, and separators wound in a jelly-roll shape. A current collecting plate is disposed on a side of the electrode assembly. The current collecting plate may be electrically connected to a terminal arranged in the cap. Thus, when the terminal of the cap is connected to an external terminal, a current generated in the electrode assembly is supplied to the external terminal via the current collecting plate and the terminal of the cap.

The current collecting plate is welded to the side of the electrode assembly to form a current path and support the jelly-roll shape of the separators in the electrode assembly. If the current collecting plate is too thick, weldability of the current collecting plate to the electrode assembly may decrease. On the other hand, if the current collecting plate is too thin, electrical resistance of the current collecting plate in a longitudinal direction may increase, and strength of the current collecting plate to support the electrode assembly may decrease. As a result, the electrode assembly may be easily moved by vibration or shock, and the welded portion may be broken. Therefore, a current collecting plate needs to improve the weldability, the electrical resistance, and the strength, to support the electrode assembly.

SUMMARY

Embodiments are therefore directed to a current collecting plate and a secondary battery including the same, which substantially overcome one or more of the problems due to the limitations and disadvantages of the related art.

It is therefore a feature of an embodiment to provide a secondary battery, comprising: an electrode assembly including a positive electrode, a negative electrode, and separators which are wound together; current collecting plates attached to the electrode assembly, each of the current collecting plates including a current collecting part and a welding part, the current collecting parts electrically connecting to the electrode assembly, the welding part being welded to the electrode assembly and the current collecting part; a case configured to accommodate the electrode assembly and the current collecting plates; and a cap configured to cover an opening of the case and electrically connect to the current collecting plates.

The current collecting part may include a vent hole, and the welding part may be inserted into the vent hole, and include a first part that is welded to either of the positive electrode and the negative electrode of the electrode assembly and a second part that is welded to inner walls of the vent hole.

The second part may be disposed so as not to allow the welding part to protrude to the outside of the current collecting part.

The second part may include ends of the welding part, and the first part may be in a center of the welding part.

The welding part may be thinner than the current collecting part.

A thickness of the welding part may be in the range from about 0.2 mm to about 0.5 mm.

A thickness of the current collecting part may be in the range from about 1.2 mm to about 1.5 mm.

The positive electrode, one of the separators, the negative electrode, and another of the separators may be wound in order thereof.

It is therefore another feature of an embodiment to provide a current collecting plate to be attached to an electrode assembly including a positive electrode, a negative electrode, and separators that are wound together to collect a current of the positive electrode or negative electrode to a terminal, the current collecting plate comprising: current collecting parts configured to be attached to the electrode assembly and electrically connect to the electrode assembly; and a welding part configured to be welded to the electrode assembly and the current collecting part.

The current collecting parts may include a vent hole, and the welding part may be inserted into the vent hole, and include a first part configured to be welded to either of the positive electrode and the negative electrode of the electrode assembly and a second part configured to be welded to inner walls of the vent hole.

The second part may be disposed so as not to allow the welding part to protrude to the outside of the current collecting part.

The second part may include ends of the welding part, and the first part is in a center of the welding part.

The welding part may be thinner than the current collecting part.

A thickness of the welding part may be in the range from about 0.2 mm to about 0.5 mm.

A thickness of the current collecting part may be in the range from about 1.2 mm to about 1.5 mm.

In a secondary battery according to the embodiment, a current collecting plate including a thick current collecting part and a thin welding unit. The thick current collecting part may decrease electrical resistance and obtain strength to support the electrode assembly. The thin welding unit may obtain weldability to the electrode assembly. Thus, appropriate electrical resistance, weldability, and strength to support the electrode assembly may be obtained.

BRIEF DESCRIPTION OF THE DRAWINGS

The above and other features and advantages will become more apparent to those of ordinary skill in the art by describing in detail exemplary embodiments with reference to the attached drawings, in which.

DETAILED DESCRIPTION

Figure 1:
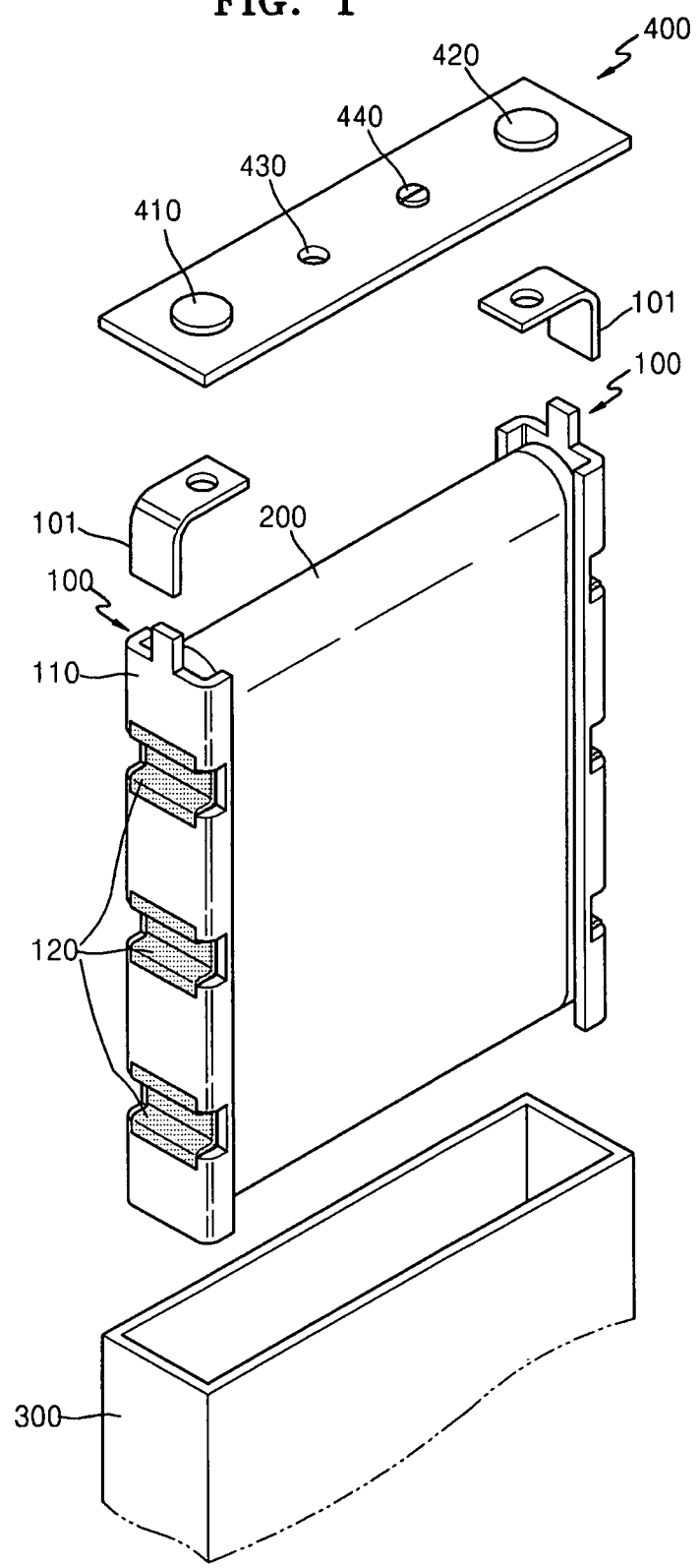
FIG. 1 illustrates a schematic configuration of a secondary battery according to an embodiment.

Korean Patent Application No. 10-2009-0104305, filed on Oct. 30, 2009, in the Korean Intellectual Property Office, and entitled: "Current Collecting Plate and Secondary Battery Including Current Collecting Plate," is incorporated by reference herein in its entirety.

Exemplary embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey the scope of the invention to those skilled in the art.

In the drawing figures, the dimensions of layers and regions may be exaggerated for clarity of illustration. Reference will now be made in detail to embodiments, examples of which are illustrated in the accompanying drawings, wherein like reference numerals refer to the like elements throughout.

FIG. 1 illustrates a schematic configuration of a secondary battery according to an embodiment. Referring to FIG. 1, the secondary battery may include an electrode assembly 200, current collecting plates 100, a case 300, and a cap 400. The electrode assembly 200 may include a positive electrode, a negative electrode, and separators wound in a jelly-roll shape. The current collecting plates 100 may be respectively attached to both sides of the electrode assembly 200. The case 300 may accommodate the electrode assembly 200 and the current collecting plates 100. The cap 400 may be configured to cover an open portion of the case 300. The electrode assembly 200 and the current collecting plates 100 attached to electrode assembly 200 may be installed in the case 300 through the open portion of the case 300. The open portion of the case 300 may be covered by the cap 400 to prepare a cell which accommodates the electrode assembly 200 in a stable state.

A sealing part 440 may seal an inlet of the secondary battery after an electrolytic solution is injected into the case 300. A safety vent 430 may break when a pressure in the case 300 is so excessive as to allow gas in the case 300 to be exhausted. A positive electrode terminal 410 and a negative electrode terminal 420 may be connected to an external terminal.

Figure 2:
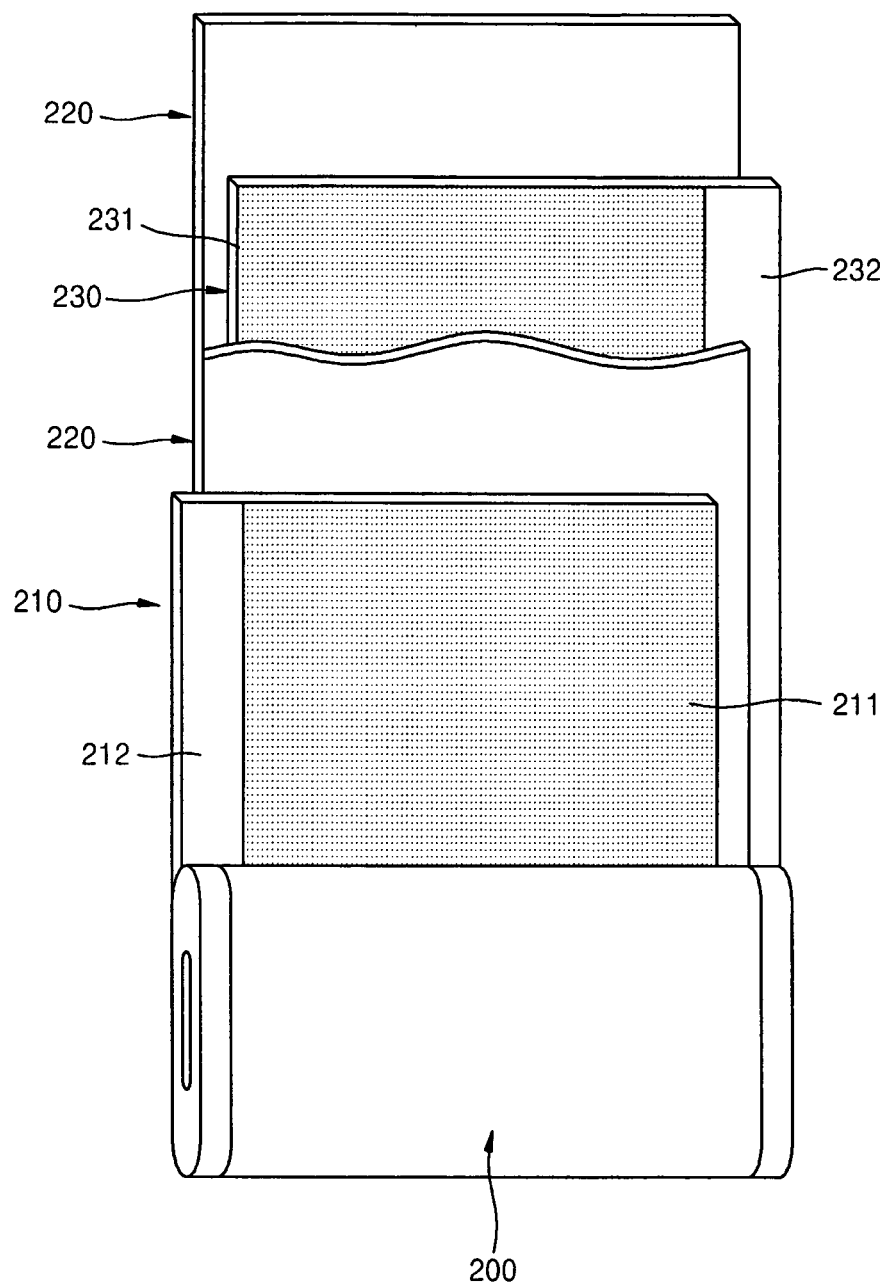
FIG. 2 illustrates a schematic configuration of the electrode assembly illustrated in FIG. 1 according to an embodiment.

FIG. 2 illustrates a schematic configuration of the electrode assembly 200 illustrated in FIG. 1 according to an embodiment. Referring to FIG. 2, the electrode assembly 200 may include a positive electrode 210, separators 220, and a negative electrode 230. The positive electrode 210, one of the separators 220, the negative electrode 230, and another separator 220 may be stacked in this order and wound in a jelly-roll shape. The positive electrode 210 may be coated with a positive electrode active material 211. The negative electrode 230 may be coated with a negative electrode active material 231. In addition, the positive electrode 210 may have a non-coated portion 212 on one of its edges. The negative electrode 230 may have a non-coated portion 232 on one of its edges. The non-coated portions 212 and 232 may not be coated with any active material. The non-coated portion 212 of the positive electrode 210 and the non-coated portion 232 of the negative electrode 230 may be arranged such that the electrode assembly 200 may have the non-coated portion 212 on one of the edges of the electrode assembly 200 and the non-coated portion 232 on the other edge of the electrode assembly 200. For example, the electrode assembly 200 may have the non-coated portion 212 of the positive electrode 210 at a left side of the electrode assembly 200, while the non-coated portion 232 of the negative electrode 230 at a right side of the electrode assembly 200. Thus, the current collecting plate 100 attached to a left side of the electrode assembly 200 as illustrated in FIG. 1 may be electrically connected to the positive electrodes 210 of the electrode assembly 200. On the other hand, the current collecting plate 100 attached to a right side of the electrode assembly 200 as illustrated in FIG. 1 may be electrically connected to the negative electrodes 230 of the electrode assembly 200. As illustrated in FIG. 1, the current collecting plates 100 may be connected to the positive electrode terminal 410 and the negative electrode terminal 420 via lead parts 101, respectively.

Figure 3:
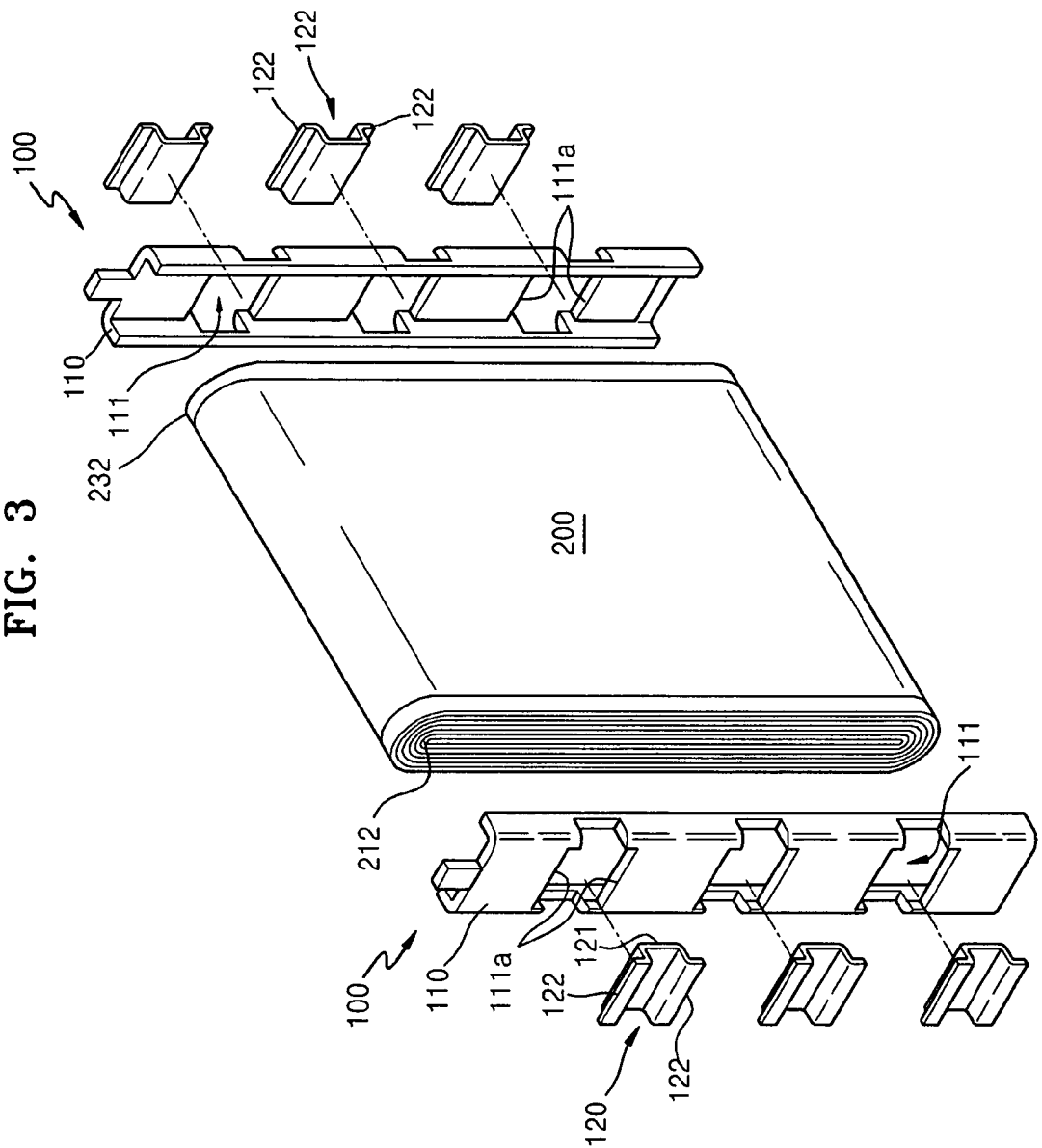
FIG. 3 illustrates a schematic configuration of the current collecting plates illustrated in FIG. 1 according to an embodiment.
Figure 4:
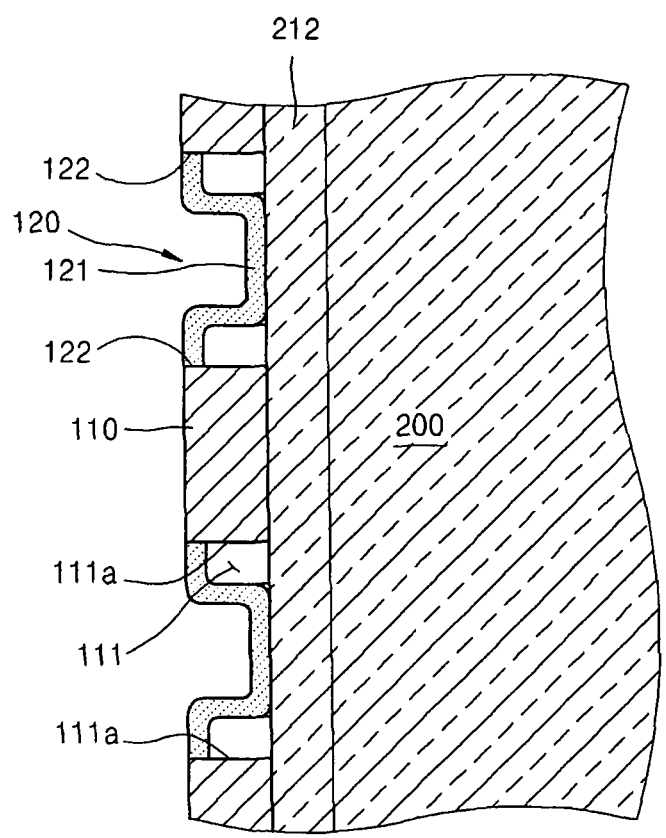
FIG. 4 illustrates a cross-sectional view of an adhesion structure between the electrode assembly and one of the current collecting plates illustrated in FIG. 1 according to an embodiment.

FIG. 3 illustrates a schematic configuration of the current collecting plates 100 illustrated in FIG. 1 according to an embodiment. FIG. 4 illustrates a cross-sectional view of an adhesion structure between the electrode assembly and one of the current collecting plates illustrated in FIG. 1 according to an embodiment.

Each of the current collecting plates 100 may include a current collecting part 110 and at least one welding part 120 having weldability. In other words, each of the current collecting plates 100 may not be formed of a single part. Instead, the current collecting part 110 and the welding parts 120 may be separately prepared, and joined together.

The current collecting parts 110 may be used to support the electrode assembly 200 and decrease electrical resistance. Therefore, current collecting parts 110 may be relatively thicker than the welding parts 120. The thickness of each current collecting part 110 may be in the range from about 1.2 nm to about 1.5 mm. In such a range, the current collecting parts 110 may be attached to both sides of the electrode assembly 200 so as to support the electrode assembly 200 and prevent the electrode assembly 200 from moving easily. In addition, the current collecting parts 110 may be thick enough not to increase electrical resistance of the current collecting parts 110 in a longitudinal direction. Each current collecting part 110 may have at least one vent hole 111. The welding parts 120 may be inserted into the vent holes 111 and joined with each current collecting part 110. This configuration is described in detail below.

The thickness of the welding parts 120 may be in the range from about 0.2 mm to about 0.5 mm. This thickness is less than the thickness of the current collecting part 110 and too thin to obtain weldability. Referring to FIG. 3, each of the welding parts 120 may be hat-shaped, and has a protrusion 121 in the center of each welding part. The protrusion 121 may be inserted into the vent hole 111 and adhered to the non-coated portion 212 or 232. The non-coated portion 212 or 232 is arranged in the positive electrode 210 or the negative electrode 230 of the electrode assembly 200. The protrusion 121 and the non-coated portion 212 or 232 may be connected by laser welding or resistance welding. In addition, both ends 122 of each welding part 120 may be fitted into inner walls 111a of the vent hole 111 and welded to the inner walls 111a using laser welding or resistance welding. Since both ends 122 are welded to the inner walls 111a of the vent hole 111 after being fitted into the inner walls 111a, the welding part 120 may not protrude to the outside of the current collecting parts 110. If the welding part 120 protrudes to the outside, the case 300 may have a larger size. Thus, the ends 122 may be fitted into the inner walls 111a so as not to allow the welding part 120 to protrude to the outside. Such a configuration may be suitable to decrease a size of a product.

As described above, the current collecting part 110 may be relatively thicker, and thus, may be used to decrease electrical resistance of the current collecting part 110 and obtain strength to support the electrode assembly 200. On the other hand, the welding parts 120 may be relatively thinner, and thus, may be used to obtain weldability. Accordingly, while the electrical resistance may be easily decreased, the strength to support the electrode assembly 200 and weldability may easily be obtained.

A secondary battery including the current collecting plate 100 may be assembled as follows.

First, as illustrated in FIG. 2, the positive electrode 210, the separator 220, the negative electrode 230, and the separator 220 may be stacked in this order and wound in a jelly-roll shape to prepare the electrode assembly 200.

Subsequently, the current collecting part 110 of the current collecting plate 100 may be attached to both sides of the electrode assembly 200. The welding part 120 may be inserted into the vent hole 111 of the current collecting part 110. Then, the protrusion 121 of the welding part 120 may be fitted into the non-coated portion 212 of the positive electrode 210 or the non-coated portion 232 of the negative electrode 230. The ends 122 of the welding part 120 may be fitted into the inner walls 111a of the corresponding vent hole 111, and welded with the inner walls 111a. Referring to FIG. 1, a lead part 101 may be attached to each current collecting part 110.

Next, the electrode assembly 200 with the current collecting plates 100 attached to the electrode assembly 200 may be put in the case 300. The open portion of the case 300 may be covered by the cap 400. The case 300 may be filled with an electrolytic solution, and sealed with the sealing part 440 so that the manufacture of a cell is completed.

To determine electrical resistance of the cell, electrical resistance values of commonly used current collecting plate and the current collecting plate according to the embodiment were measured. The measurement results are shown in Table 1. As shown in Table 1, the electrical resistance of the current collecting plate in the embodiment is half of the electrical resistance of the commonly used current collecting plate.

TABLE 1

|  | Commonly used current collecting plate (thickness: 0.5 mm) | Current collecting plate according to the embodiment (thickness of current collecting part: 1.5 mm, thickness of the welding part: 0.5 mm) |
| --- | --- | --- |
| Positive electrode (mΩ) | 1.405 | 0.703 |
| Negative electrode (mΩ) | 0.880 | 0.440 |
| Total resistance (mΩ) | 2.285 | 1.143 |

As described above, according to the embodiments, a current collecting plate may have low electrical resistance, strong strength to support the electrode assembly, and enhanced weldability.

Exemplary embodiments have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the invention as set forth in the following claims.

What is claimed is:

1. A secondary battery, comprising:
    an electrode assembly including a positive electrode, a negative electrode, and separators which are wound together;
    current collecting plates attached to the electrode assembly, each of the current collecting plates including a current collecting part and a welding part, the current collecting part and the welding part being discrete parts completely separable from each other, the current collecting part being electrically connected to the electrode assembly, and the welding part being welded to the electrode assembly and the current collecting part;
    a case configured to accommodate the electrode assembly and the current collecting plates; and
    a cap configured to cover an opening of the case and electrically connect to the current collecting plates,
    wherein both the welding part and the current collecting part contact the electrode assembly, and an empty space is defined between the current collecting part and an immediately adjacent welding part.

2. The secondary battery as claimed in claim 1, wherein:
    the current collecting part includes a plurality of vent holes spaced apart from each other along a first direction, each vent hole exposing a portion of uncoated positive or negative electrodes in the electrode assembly, and
    a welding part is inserted into each vent hole, each welding part including a first part that directly contacts the exposed portion of the uncoated positive electrode or negative electrode of the electrode assembly through a respective vent hole, and a second part that directly contacts inner walls of the respective vent hole.

3. The secondary battery as claimed in claim 2, wherein the second part is disposed so as not to allow the welding part to protrude to the outside of the current collecting part.

4. The secondary battery as claimed in claim 2, wherein the second part includes ends of the welding part, and the first part is in a center of the welding part.

5. The secondary battery as claimed in claim 1, wherein the welding part is thinner than the current collecting part.

6. The secondary battery as claimed in claim 5, wherein a thickness of the welding part is in the range from about 0.2 mm to about 0.5 mm.

7. The secondary battery as claimed in claim 5, wherein a thickness of the current collecting part is in the range from about 1.2 mm to about 1.5 mm.

8. The secondary battery as claimed in claim 1, wherein the positive electrode, one of the separators, the negative electrode, and another of the separators are wound in order thereof.

9. A current collecting plate to be attached to an electrode assembly including a positive electrode, a negative electrode, and separators that are wound together to collect a current of the positive electrode or negative electrode to a terminal, the current collecting plate comprising:
    current collecting parts configured to be attached to the electrode assembly and electrically connect to the electrode assembly; and
    a welding part configured to be welded to the electrode assembly and the current collecting part, the current collecting parts and the welding part being discrete parts completely separable from each other,
    wherein both the welding part and the current collecting part contact the electrode assembly, and an empty space is defined between the current collecting part and an immediately adjacent welding part.

10. The current collecting plate as claimed in claim 9, wherein each of the current collecting parts includes a vent hole, and the welding part is inserted into the vent hole, and includes a first part configured to be welded to either of the positive electrode and the negative electrode of the electrode assembly and a second part configured to be welded to inner walls of the vent hole.

11. The current collecting plate as claimed in claim 10, wherein the second part is disposed so as not to allow the welding part to protrude to the outside of the current collecting part.

12. The current collecting plate as claimed in claim 10, wherein the second part includes ends of the welding part, and the first part is in a center of the welding part.

13. The current collecting plate as claimed in claim 9, wherein the welding part is thinner than the current collecting part.

14. The current collecting plate as claimed in claim 13, wherein a thickness of the welding part is in the range from about 0.2 mm to about 0.5 mm.

15. The current collecting plate as claimed in claim 13, wherein a thickness of the current collecting part is in the range from about 1.2 mm to about 1.5 mm.

16. The secondary battery as claimed in claim 1, wherein the empty space is completely enclosed by the current collecting part, the welding part, and the electrode assembly, the current collecting part and the welding part being in direct contact with each other and with the electrode assembly.

17. The secondary battery as claimed in claim 2, wherein the first part of the welding part is a protrusion, and the second part of the welding part are edges extending along the first direction, the edges of each welding part contacting opposite inner sidewalls of a respective vent hole, and the protrusion extending away from the edges toward the electrode assembly.

18. The secondary battery as claimed in claim 17, wherein a contact surface of the protrusion and electrode assembly is smaller than the exposed portion of the uncoated positive or negative electrodes through each vent hole, an empty space being defined within each vent hole between the current collecting part and the welding part.

19. The secondary battery as claimed in claim 18, wherein only terminal ends of the edges of the welding part contact the current collecting part in each vent hole, the edges extending away from the protrusion along the first direction to overlap a portion of the vent hole.

* * * * *